US012216676B2

(12) United States Patent
    Ogievetsky

(10) Patent No.: US 12,216,676 B2
(45) Date of Patent: Feb. 4, 2025

(54) DYNAMIC QUERY ENGINE FOR DATA VISUALIZATION

(71) Applicant: Imply Data, Inc., Burlingame, CA (US)

(72) Inventor: Vadim Ogievetsky, San Francisco, CA (US)

(73) Assignee: Imply Data, Inc., Burlingame, CA (US)

(*) Notice: Subject to any disclaimer, the term of this patent is extended or adjusted under 35 U.S.C. 154(b) by 0 days.

(21) Appl. No.: 17/829,239

(22) Filed: May 31, 2022

(65) Prior Publication Data

US 2022/0382779 A1  Dec. 1, 2022

Related U.S. Application Data

(60) Provisional application No. 63/194,906, filed on May 28, 2021.

(51) Int. Cl.
    *G06F 16/26* (2019.01)
    *G06F 16/22* (2019.01)
    *G06F 16/28* (2019.01)

(52) U.S. Cl.
    CPC .......... *G06F 16/26* (2019.01); *G06F 16/2264* (2019.01); *G06F 16/2282* (2019.01); *G06F 16/287* (2019.01)

(58) Field of Classification Search
    None
    See application file for complete search history.

(56) References Cited

U.S. PATENT DOCUMENTS

| | | | |
|---|---|---|---|
| 10,289,283 B1 | 5/2019 | Cao et al. | |
| 2003/0145004 A1 | 7/2003 | Egilsson et al. | |
| 2013/0246484 A1* | 9/2013 | Stolte | G06F 16/283 707/807 |
| 2015/0347528 A1* | 12/2015 | Jugel | G06F 16/24535 707/759 |
| 2017/0039741 A1* | 2/2017 | Bhatnagar | G06Q 40/12 |
| 2017/0092008 A1 | 3/2017 | Djorgovski et al. | |
| 2020/0201927 A1* | 6/2020 | Narula | G06F 16/904 |
| 2020/0294292 A1* | 9/2020 | Li | G06T 11/206 |
| 2022/0043960 A1* | 2/2022 | Zhang | G06T 11/60 |

OTHER PUBLICATIONS

PCT International Search Report and Written Opinion; Application No. PCT/US2022/031660 Imply Data, Inc., International Filing Date 311 May 2022, mailing date of Oct. 12, 2022, 14 pages.

* cited by examiner

*Primary Examiner* — Dawaune A Conyers
(74) *Attorney, Agent, or Firm* — Patent Law Works, LLP

(57) ABSTRACT

A system and method for implementing a dynamic query mechanism to facilitate on-demand data visualization is disclosed. The method includes receiving user interaction in association with rendering a visualization of a data cube, determining a set of visibility constraints based on the user interaction, periodically checking in with a data container to determine whether there is data to load based on the set of visibility constraints, issuing a query to fetch values of the data from a database responsive to determining that there is data to load, dynamically loading the fetched values of the data into the data container, and rendering the visualization of the data cube using the data container.

20 Claims, 7 Drawing Sheets

DYNAMIC QUERY ENGINE FOR DATA VISUALIZATION

CROSS-REFERENCE TO RELATED APPLICATIONS

The present application claims priority, under 35 U.S.C. § 119, of U.S. Provisional Patent Application No. 63/194,906, filed May 28, 2021, and entitled "Dynamic Query Engine for Data Visualization," which is incorporated by reference in its entirety.

BACKGROUND

The specification generally relates to implementing a dynamic query mechanism for facilitating data visualization. In particular, the specification relates to a system and method for implementing a dynamic query mechanism to facilitate on-demand data exploration, ad-hoc data analytics, and interactive visualizations.

Business users explore and investigate all of a company's datasets and business activity for insight that may impact day-to-day and long-range decision making. Oftentimes, data queries made by such business users, such as online analytical processing (OLAP) based queries, return thousands of rows of data in real-time data analytics. However, data visualization and user interaction with results of such large queries is problematic and limited. There is a persistent need for a dynamic query mechanism that powers real-time ingestion, interactive ad-hoc queries, and intuitive visualizations for many types of event-driven and streaming data flows.

This background description provided herein is for the purpose of generally presenting the context of the disclosure.

SUMMARY

The techniques introduced herein overcome the deficiencies and limitations of the prior art, at least in part, with a system and method for implementing a dynamic query mechanism to facilitate data exploration, ad-hoc data analytics, and interactive visualizations.

According to one innovative aspect of the subject matter described in this disclosure, a method includes: receiving user interaction in association with rendering a visualization of a data cube, determining a set of visibility constraints based on the user interaction, periodically checking in with a data container to determine whether there is data to load based on the set of visibility constraints, issuing a query to fetch values of the data from a database responsive to determining that there is data to load, dynamically loading the fetched values of the data into the data container, and rendering the visualization of the data cube using the data container.

According to another innovative aspect of the subject matter described in this disclosure, a system includes: one or more processors; a memory storing instructions, which when executed cause the one or more processors to: receive user interaction in association with rendering a visualization of a data cube, determine a set of visibility constraints based on the user interaction, periodically check in with a data container to determine whether there is data to load based on the set of visibility constraints, issue a query to fetch values of the data from a database responsive to determining that there is data to load, dynamically load the fetched values of the data into the data container, and render the visualization of the data cube using the data container.

These and other implementations may each optionally include one or more of the following features. For instance, the features may include determining the set of visibility constraints based on the user interaction comprising determining a height, a width, and an area visible in the user interface depicting the visualization of the data cube on a display screen of a device responsive to receiving the user interaction, and determining the set of visibility constraints based on the height, the width, and the area visible in the user interface depicting the visualization of the data cube on the display screen of the device, periodically checking in with the data container to determine whether there is data to load further comprising identifying a split axis and a measure that needs loading in association with the visualization of the data cube based on the set of visibility constraints, determining the data including one or more values of the split axis in the data container to load, determining a coordinate to map into the data container using the values of the split axis and the measure, and determining the data including a facet in the data container that maps to the coordinate to load, periodically checking in with the data container to determine whether there is data to load further comprising determining whether there is a change in the set of visibility constraints, the user interaction including one from a group of filtering data in the visualization of the data cube, splitting the data in the visualization of the data cube, selecting a type of visualization, a measure, and a comparison of measure in the visualization of the data cube, and scrolling a user interface depicting the visualization of the data cube on a display screen of a device, the data container comprising a number of split axes and an array of selected measures in association with rendering the visualization of the data cube, the data container being a data structure comprising a multidimensional array of facets, each facet indexed by a coordinate including filter and measure, each one in the set of visibility constraints being a pair of numbers representing a minimum and maximum number of values to load in the visualization of the data cube, and the database being a table.

Other implementations of one or more of these aspects and other aspects include corresponding systems, apparatus, and computer programs, configured to perform the various action and/or store various data described in association with these aspects. Numerous additional features may be included in these and various other implementations, as discussed throughout this disclosure.

The features and advantages described herein are not all-inclusive and many additional features and advantages will be apparent in view of the figures and description. Moreover, it should be understood that the language used in the present disclosure has been principally selected for readability and instructional purposes, and not to limit the scope of the subject matter disclosed herein.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
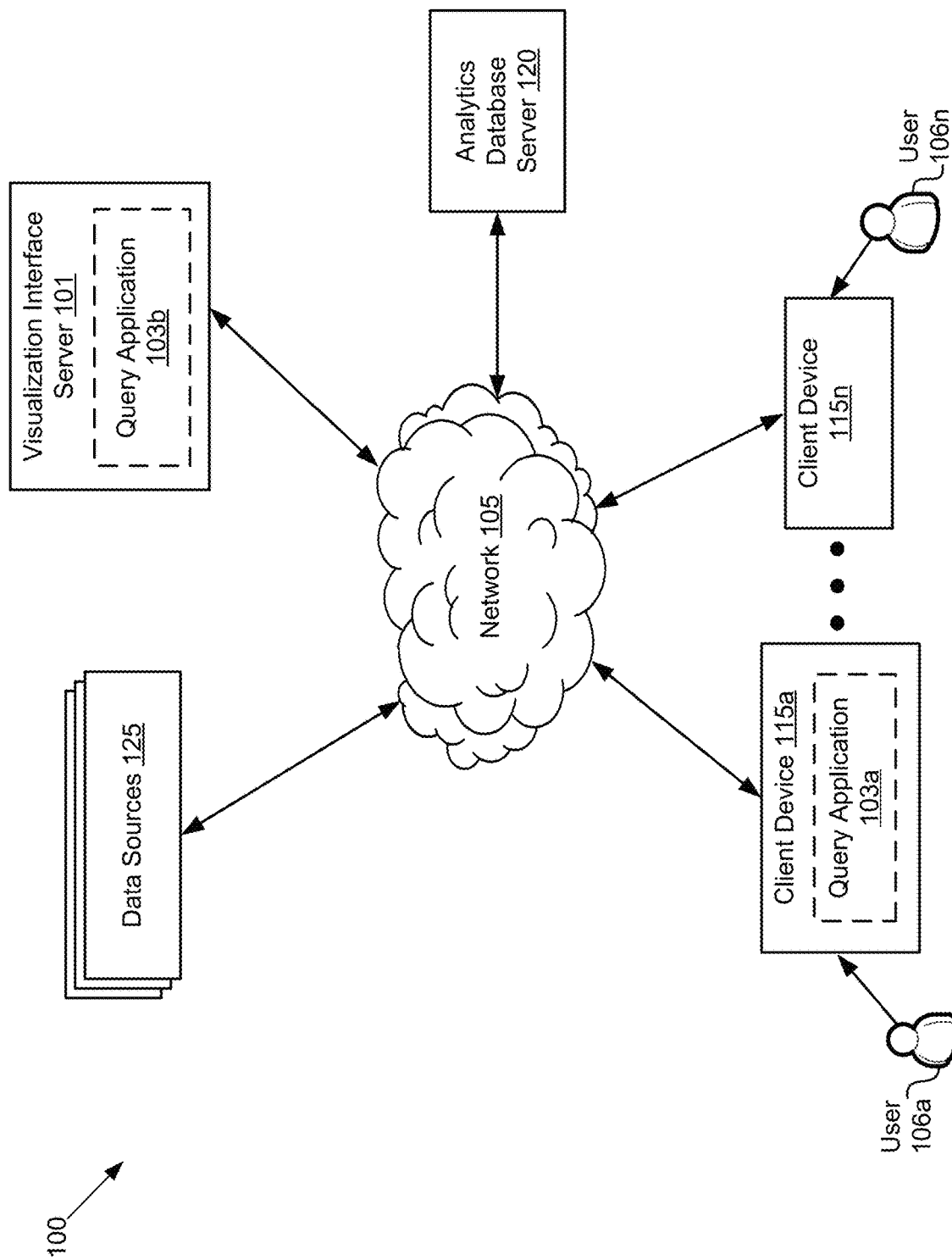
FIG. 1 is a high-level block diagram illustrating one implementation of a system for implementing a dynamic query mechanism to facilitate on-demand data visualization.

FIG. 1 is a high-level block diagram illustrating one implementation of an example system 100 for implementing a dynamic query mechanism to facilitate on-demand data visualization. The illustrated system 100 may have one or more client devices 115a . . . 115n that can be accessed by users 106a . . . 106n, a visualization interface server 101, an analytics database server 120, and a plurality of data sources 125. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105 for interaction and electronic communication with one another. While one implementation of the functionality of the system 100 is described below with reference to the client-server architecture shown in FIG. 1, it should be understood that the functionality of the system 100 may be implemented in other architectures. For example, in some implementations, the system 100 may be configured on a single computer (or virtual machine) coupled to the network 105 to provide a loopback communication using Transmission Control Protocol (TCP) or sockets.

The network 105 may be a conventional type, wired or wireless, and may have numerous different configurations including a star configuration, token ring configuration, or other configurations. Furthermore, the network 105 may include any number of networks and/or network types. For example, the network 105 may include a local area network (LAN), a wide area network (WAN) (e.g., the Internet), virtual private networks (VPNs), mobile (cellular) networks, wireless wide area network (WWANs), WiMAX® networks, Bluetooth® communication networks, peer-to-peer networks, near field networks (e.g., NFC, etc.), and/or other interconnected data paths across which multiple devices may communicate, various combinations thereof, etc. The network 105 may also be coupled to or include portions of a telecommunications network for sending data in a variety of different communication protocols. In some implementations, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. In some implementations, the data transmitted by the network 105 may include packetized data (e.g., Internet Protocol (IP) data packets) that is routed to designated computing devices coupled to the network 105. Although FIG. 1 illustrates one network 105 coupled to the client devices 115, the visualization interface server 101, the analytics database server 120, and the plurality of data sources 125, in practice one or more networks 105 can be connected to these entities.

The client devices 115a . . . 115n (also referred to individually and collectively as 115) may be computing devices having data processing and communication capabilities. In some implementations, a client device 115 may include a memory, a processor (e.g., virtual, physical, etc.), a power source, a network interface, software and/or hardware components, such as a display, graphics processing unit (GPU), wireless transceivers, keyboard, camera (e.g., webcam), sensors, firmware, operating systems, web browsers, applications, drivers, and various physical connection interfaces (e.g., USB, HDMI, etc.). The client devices 115a . . . 115n may couple to and communicate with one another and the other entities of the system 100 via the network 105 using a wireless and/or wired connection. Examples of client devices 115 may include, but are not limited to, laptops, desktops, tablets, mobile phones (e.g., smartphones, feature phones, etc.), server appliances, servers, virtual machines, smart TVs, media streaming devices, user wearable computing devices or any other electronic device capable of accessing a network 105.

In the example of FIG. 1, the client device 115a is configured to implement a query application 103a described in more detail below. The client device 115 includes a display for viewing information provided by one or more entities coupled to the network 105. For example, the client device 115 may be adapted to send and receive data to and from one or more of the visualization interface server 101, the data sources 125, and the analytics database server 120. While FIG. 1 illustrates two client devices 115a and 115n, the disclosure applies to a system architecture including any number of client devices 115. In addition, the client devices 115a . . . 115n may be the same or different types of computing devices. The client devices 115a . . . 115n may be associated with the users 106a . . . 106n. For example, users 106a . . . 106n may be authorized personnel including data managers, data analysts, admins, end users, engineers, technicians, administrative staff, etc. of a business organization. In some implementations, the client device 115 may run a user application. The user application may include web, mobile, enterprise, and cloud application. For example, the client device 115 may include a web browser that may run JavaScript or other code to allow authorized personnel to access the functionality provided by other entities of the system 100 coupled to the network 105. In some implementations, the client device 115 may be implemented as a computing device 200 as will be described below with reference to FIG. 2.

In the example of FIG. 1, the system 100 may include a visualization interface server 101, a plurality of data sources 125, and an analytics database server 120 coupled to the network 105. The entities 101, 120, and 125 may be, or may be implemented by, a computing device including a processor, a memory, applications, a database, and network communication capabilities similar to that described below with reference to FIG. 2.

In some implementations, each one of the entities 101, 120, and 125 of the system 100 may be a hardware server, a software server, or a combination of software and hardware. For example, the visualization interface server 101 may include one or more hardware servers, virtual servers, server arrays, storage devices and/or systems, etc., and/or may be centralized or distributed/cloud-based. In some implementations, each one of the entities 101, 120, and 125 of the system 100 may include one or more virtual servers, which operate in a host server environment and access the physical hardware of the host server including, for example, a processor, a memory, applications, a database, storage, network interfaces, etc., via an abstraction layer (e.g., a virtual machine manager). In some implementations, each one of the entities 101, 120, and 125 of the system 100 may be a Hypertext Transfer Protocol (HTTP) server, a Representational State Transfer (REST) service, or other server type, having structure and/or functionality for processing and satisfying content requests and/or receiving content from the other entities 101, 120, and 125 and one or more of the client devices 115 coupled to the network 105. Also, instead of or in addition, each one of the entities 101, 120, and 125 of the system 100 may implement its own application programming interface (API) for facilitating access and the transmission of instructions, data, results, and other information to other one of the entities 101, 120, and 125 communicatively coupled to the network 105.

In the example of FIG. 1, the components of the visualization interface server 101 may be configured to implement a query application 103b described in more detail below. In some implementations, the visualization interface server 101 may provide a service for facilitating online analytical processing (OLAP), such as data analysis, data exploration, and visualization of large datasets. For example, the visualization interface server 101 enables a data manager to create a data cube and set permissions for an end user to access the data cube. Data managers embed their knowledge into data cubes by creating a variety of dimensions and measures. A data cube is the basic unit of representation of data used for visualization. An end user may interact with a view of the data cube by selecting the data cube in the user interface. The end user may freely explore the data across available dimensions and measures. The data cubes may also include the key performance indicators (KPIs) that the end user is interested in encoded as measures. It should be understood that the visualization interface server 101 is not limited to providing the above-noted acts and/or functionality and may include other network-accessible services.

In some implementations, the visualization interface server 101 may be configured to send and receive data and analytics to and from other entities of the system 100 via the network 105. For example, the visualization interface server 101 sends and receives data including instructions to and from the client device 115. In some implementations, the visualization interface server 101 may serve as a middle layer and permit interactions between the client device 115 and each of the analytics database server 120 and the plurality of data sources 125 to flow through and from the visualization interface server 101. In some implementations, the visualization interface server 101 may use a set of query tools including a query planner and a custom query language to make expressions for querying and interacting with big data in the analytics database server 120. In some implementations, the visualization interface server 101 may also include database (not shown) coupled to it (e.g., over the network 105) to store structured data in a relational database and a file system (e.g., HDFS, NFS, etc.) for unstructured or semi-structured data. In some implementations, the visualization interface server 101 may include an instance of a data storage 243 that stores various types of data for access and/or retrieval by the query application 103b. Although only a single visualization interface server 101 is shown in FIG. 1, it should be understood that there may be any number of visualization interface servers 101 or a server cluster. It should be understood that the visualization interface server 101 may be representative of a data analytics service provider and there may be multiple data analytics service providers coupled to the network 105, each having its own server or a server cluster, applications, application programming interface, etc.

In the example of FIG. 1, the system 100 may include a plurality of data sources 125. The plurality of data sources 125 may communicate with one or more entities of the system 100, such as the analytics database server 120 and the visualization interface server 101. The plurality of data sources 125 may include a data warehouse, a system of record (SOR), or belonging to a data repository owned by an organization that provides real-time or close to real-time data automatically or responsive to being polled or queried by the analytics database server 120 and/or the visualization interface server 101. For example, a data source 125 may be a business-owned server that generates and stores company's raw data (e.g., a data source) which may be ingested by the analytics database server 120. Such raw data may include large, fast-moving, and up-to-date data. Examples of data provided by the plurality of data sources 125 may include, but are not limited to, marketing and advertising campaign data, product and website clickstream data, application data, network data, service performance data, supply chain activity data, Internet of Things (IoT) data, etc.

In the example of FIG. 1, the analytics database server 120 may be configured to implement an analytics database service (e.g., Apache Druid™) that is configured to receive, store, extract, load, and transform company raw data (e.g., Big data) associated with the plurality of data sources 125 for performing data exploration and visualization in conjunction with the visualization interface server 101 (e.g., Pivot). In some implementations, the analytics database server 120 and the visualization interface server 101 may be integrated into a single computing device for facilitating OLAP and configured to be deployed on premises of a business. In other implementations, the analytics database server 120 and the visualization interface server 101 may be configured to be located and deployed remotely. The analytics database server 120 may be configured to support one or more structured query language (SQL) dialects. The analytics database server 120 may be configured to stream data from message buses, such as Apache Kafka, Amazon Kinesis, etc. The analytics database server 120 may be configured to ingest data in batch mode by retrieving files from Hadoop Distributed File System (HDFS), Amazon™ Simple Storage Service (S3), or local filesystem sources. For example, a data manager may configure ingestion of data into the analytics database server 120. Data ingestion may include creating or writing into a database or 'datasource' that is queryable. For example, a datasource may include a table datasource, a union datasource, and query datasource. A data source 125 (two words) refers to a source of data that is ingested into the analytics database server 120.

The query application 103 may include software and/or logic to provide the functionality for implementing a dynamic query mechanism to facilitate on-demand data analytics and visualization by enabling fast and arbitrary drill-downs of very large data sets. In some implementations, the query application 103 may be implemented using programmable or specialized hardware, such as a field-programmable gate array (FPGA) or an application-specific integrated circuit (ASIC). In some implementations, the query application 103 may be implemented using a combination of hardware and software. In some implementations, the query application 103 may be stored and executed on a combination of the client devices 115, the analytics database server 120, and the visualization interface server 101, or by any one of the client devices 115, the analytics database server 120, or visualization interface server 101.

Figure 3:
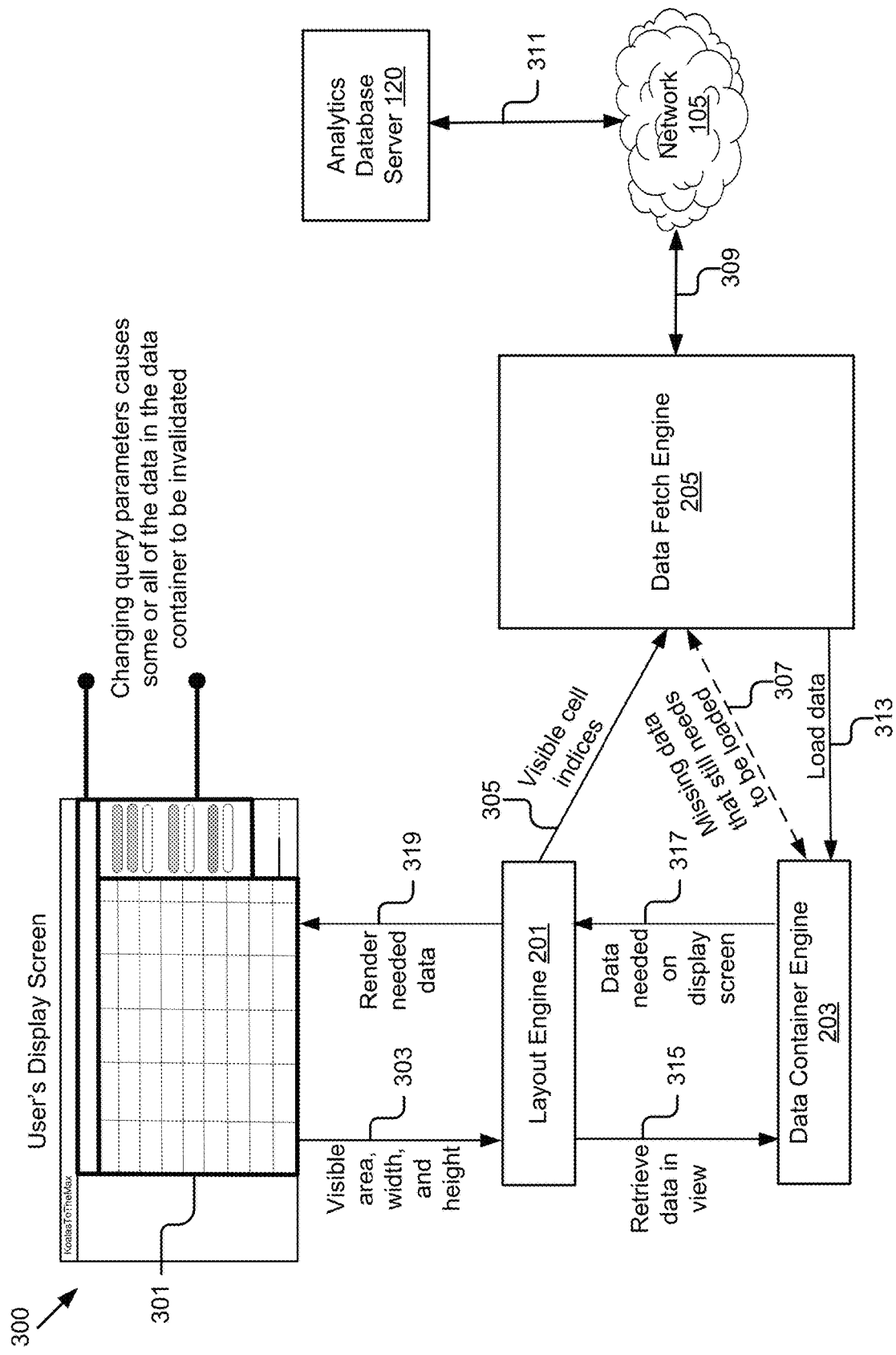
FIG. 3 shows one implementation of a general data flow through the components of the query application to facilitate on-demand visualization of data.
Figure 4:
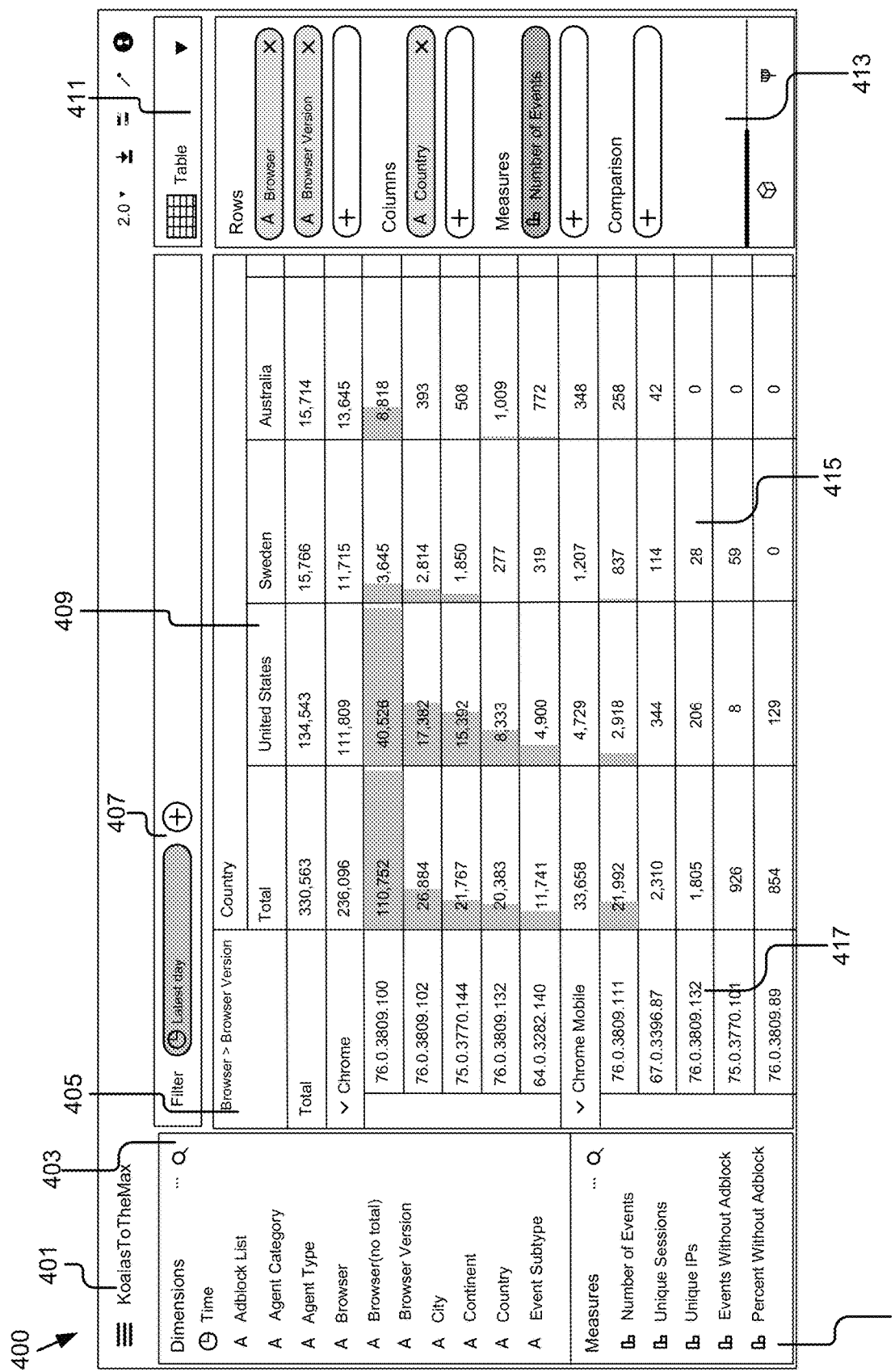
FIG. 4 shows a graphical representation of an example user interface depicting table visualization for data exploration and analysis.

As depicted in FIG. 1, the query application 103*a* and 103*b* is shown in dotted lines to indicate that the operations performed by the query application 103*a* and 103*b* as described herein may be performed at the visualization interface server 101, the client device 115, or any combinations of these components. In some implementations, each instance 103*a* and 103*b* may include one or more components of the query application 103 depicted in FIG. 2, and may be configured to fully or partially perform the functionalities described herein depending on where the instance resides. In some implementations, the query application 103 may be a thin-client application with some functionality executed on the client device 115 and additional functionality executed on the visualization interface server 101. In some implementations, the query application 103 may generate and present various user interfaces to perform these acts and/or functionality, which may in some cases be based at least in part on information received from the visualization interface server 101, the client device 115, the analytics database server 120, and/or the data sources 125 via the network 105. Non-limiting example user interfaces that may be generated for display by the query application 103 are depicted in FIGS. 3 and 4.

In some implementations, the query application 103 is code operable in a web browser, a web application accessible via a web browser, a native application (e.g., mobile application, installed application, etc.) on the client device 115, a plug-in, a combination thereof, etc. Additional structure, acts, and/or functionality of the query application 103 is further discussed below with reference to at least FIG. 2. While the query application 103 is described below as a stand-alone component, in some implementations, the query application 103 may be part of other applications in operation on the client device 115, the visualization interface server 101, and the analytics database server 120. While the examples herein describe one aspect of underlying query mechanism for data analytics, it should be understood that the query application 103 may be configured to facilitate and guide the user from end-to-end, for example, from data ingestion to data visualization.

In some implementations, the query application 103 may require users to be registered with the visualization interface server 101 to access the acts and/or functionality described herein. The query application 103 may require a user to authenticate his/her identity to access various acts and/or functionality provided by the query application 103. For example, the query application 103 may require a user seeking access to authenticate their identity by inputting credentials in an associated user interface. In another example, the query application 103 may interact with a federated identity server (not shown) to register and/or authenticate the user by receiving and verifying biometrics including username and password, facial attributes, fingerprint, and voice.

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server 101 to a client device 115, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

Figure 2:
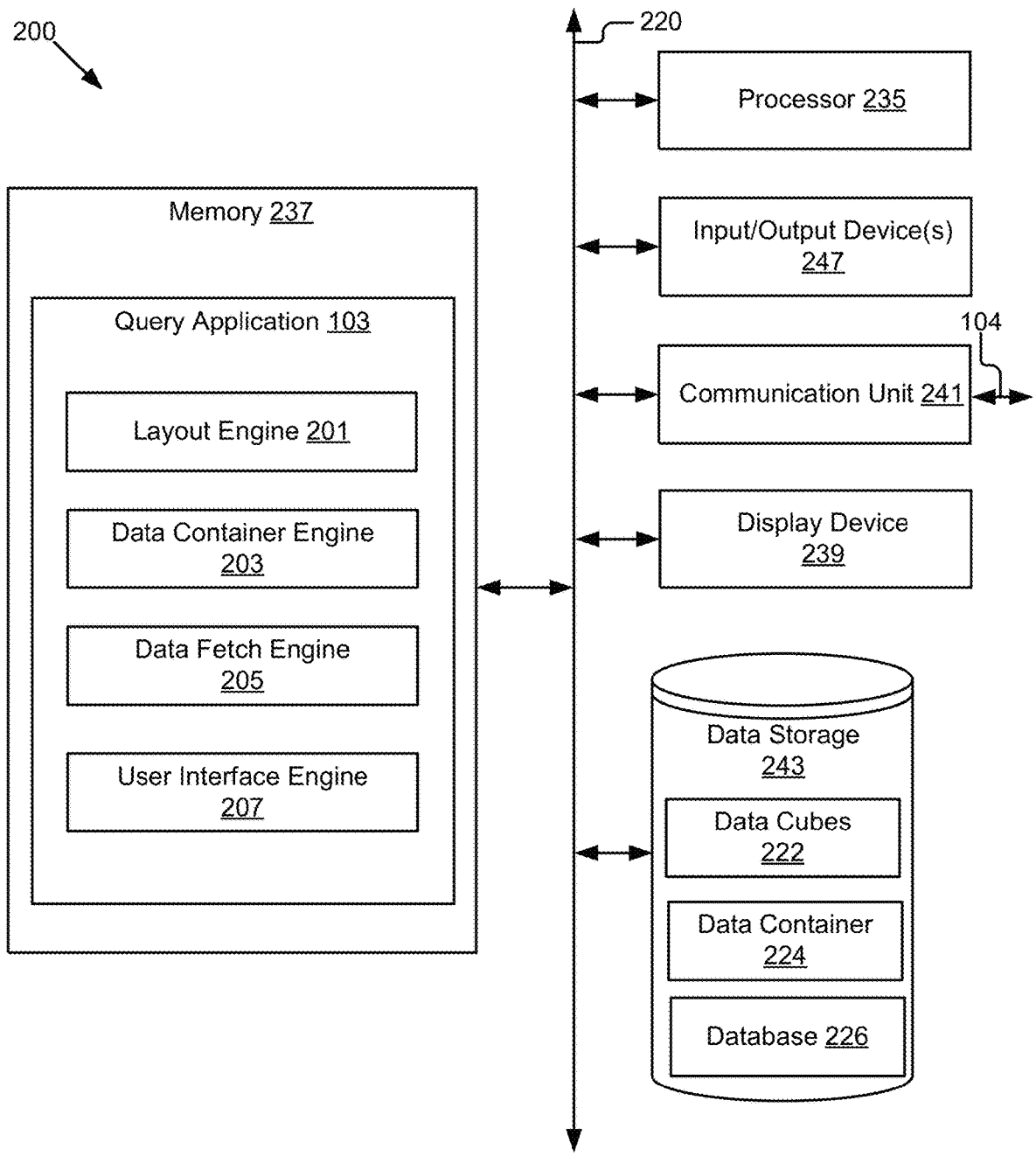
FIG. 2 is a block diagram illustrating one implementation of a computing device including a query application.

FIG. 2 is a block diagram illustrating one implementation of a computing device 200 including a query application 103. The computing device 200 may also include a processor 235, a memory 237, a display device 239, a communication unit 241, an input/output device(s) 247, and a data storage 243, according to some examples. The components of the computing device 200 are communicatively coupled by a bus 220. In some implementations, the computing device 200 may be the client device 115, the visualization interface server 101, or a combination of the client device 115 and the visualization interface server 101. In such embodiments where the computing device 200 is the client device 115 or the visualization interface server 101, it should be understood that the client device 115, and the visualization interface server 101 may take other forms and include additional or fewer components without departing from the scope of the present disclosure. For example, while not shown, the computing device 200 may include sensors, capture devices, additional processors, and other physical configurations. Additionally, it should be understood that the computer architecture depicted in FIG. 2 could be applied to other entities of the system 100 with various modifications, including, for example, the analytics database server 120 and data sources 125.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device 239, supporting the display of images, capturing and transmitting images, and performing complex tasks including various types of feature extraction and sampling. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the display device 239, the input/output device(s) 247, the query application 103, and the data storage 243.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, as depicted in FIG. 2, the memory 237 may store the query application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The bus 220 may represent one or more buses including an industry standard architecture (ISA) bus, a peripheral component interconnect (PCI) bus, a universal serial bus (USB), or some other bus providing similar functionality. The bus 220 may include a communication bus for transferring data between components of the computing device 200 or between computing device 200 and other components of the system 100 via the network 105 or portions thereof, a processor mesh, a combination thereof, etc. In some implementations, the query application 103 and various other software operating on the computing device 200 (e.g., an operating system, device drivers, etc.) may cooperate and communicate via a software communication mechanism implemented in association with the bus 220. The software communication mechanism may include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication may be configured to be secure (e.g., SSH, HTTPS, etc.).

The display device 239 may be any conventional display device, monitor or screen, including but not limited to, a liquid crystal display (LCD), light emitting diode (LED), organic light-emitting diode (OLED) display or any other similarly equipped display device, screen or monitor. The display device 239 represents any device equipped to display user interfaces, electronic images, and data as described herein. In different embodiments, the display device 230 may output display in binary (only two different values for pixels), monochrome (multiple shades of one color), or multiple colors and shades. The display device 239 is coupled to the bus 220 for communication with the processor 235 and the other components of the computing device 200. In some implementations, the display device 239 may be a touch-screen display device capable of receiving input from one or more fingers of a user. For example, the display device 239 may be a capacitive touch-screen display device capable of detecting and interpreting multiple points of contact with the display surface. In some implementations, the computing device 200 (e.g., client device 115) may include a graphics adapter (not shown) for rendering and outputting the images and data for presentation on display device 239. The graphics adapter (not shown) may be a separate processing device including a separate processor and memory (not shown) or may be integrated with the processor 235 and memory 237.

The input/output (I/O) device(s) 247 may include any standard device for inputting or outputting information and may be coupled to the computing device 200 either directly or through intervening I/O controllers. In some implementations, the I/O device 247 may include one or more peripheral devices. Non-limiting example I/O devices 247 include a touch screen or any other similarly equipped display device equipped to display user interfaces, electronic images, and data as described herein, a touchpad, a keyboard, a scanner, a stylus, an audio reproduction device (e.g., speaker), a microphone array, a barcode reader, an eye gaze tracker, a sip-and-puff device, and any other I/O components for facilitating communication and/or interaction with users. In some implementations, the functionality of the input/output device 247 and the display device 239 may be integrated, and a user of the computing device 200 (e.g., client device 115) may interact with the computing device 200 by contacting a surface of the display device 239 using one or more fingers. For example, the user may interact with an emulated (i.e., virtual or soft) keyboard displayed on the touch-screen display device 239 by using fingers to contact the display in the keyboard regions.

The communication unit 241 is hardware for receiving and transmitting data by linking the processor 235 to the network 105 and other processing systems via signal line 104. The communication unit 241 may receive data such as user input from the client device 115 and transmits the data to the query application 103, for example a user interaction to expand a view of the data on the user interface. The communication unit 241 also transmits information including on-demand data segments to the client device 115 for display, for example, in response to the user interaction. The communication unit 241 is coupled to the bus 220. In some implementations, the communication unit 241 may include a port for direct physical connection to the client device 115 or to another communication channel. For example, the communication unit 241 may include an RJ45 port or similar port for wired communication with the client device 115. In other implementations, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In other implementations, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In yet other implementations, the communication unit 241 may include a wired port and a wireless transceiver. The communication unit 241 also provides other conventional connections to the network 105 for distribution of files and/or media objects using standard network protocols such as TCP/IP, HTTP, HTTPS, and SMTP as will be understood to those skilled in the art.

The data storage 243 is a non-transitory memory that stores data for providing the functionality described herein. In some implementations, the data storage 243 may be coupled to the components 235, 237, 239, 241, and 247 via the bus 220 to receive and provide access to data. In some implementations, the data storage 243 may store data received from other elements of the system 100 including, for example, entities 101, 115, 120, 125, and/or the query applications 110, and may provide data access to these entities. The data storage 243 may store, among other data, data cubes 222, data containers 224, and datasource or database 226. The data storage 243 stores data associated with implementing a dynamic query mechanism to facilitate on-demand data analytics and visualization and other functionality as described herein. The data stored in the data storage 243 is described below in more detail.

The data storage 243 may be included in the computing device 200 or in another computing device and/or storage system distinct from but coupled to or accessible by the computing device 200. The data storage 243 may include one or more non-transitory computer-readable mediums for storing the data. In some implementations, the data storage 243 may be incorporated with the memory 237 or may be distinct therefrom. The data storage 243 may be a dynamic random-access memory (DRAM) device, a static random-access memory (SRAM) device, flash memory, or some other memory devices. In some implementations, the data storage 243 may include a database management system (DBMS) operable on the computing device 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. In some implementations, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

It should be understood that other processors, operating systems, sensors, displays, and physical configurations are possible.

As depicted in FIG. 2, the memory 237 may include the query application 103. In some implementations, the query application 103 may include a layout engine 201, a data container engine 203, a data fetch engine 205, and a user interface engine 207. The components of the query application 103 may each include software and/or logic to provide their respective functionality. In some implementations, the components of the query application 103 may each be implemented using programmable or specialized hardware including a field-programmable gate array (FPGA) or an application-specific integrated circuit (ASIC). In some implementations, the components of the query application 103 may each be implemented using a combination of hardware and software executable by the processor 235. In some implementations, the components of the query application 103 may each be sets of instructions stored in the memory 237 and configured to be accessible and executable by the processor 235 to provide their acts and/or functionality. In some implementations, the components of the query application 103 may each be adapted for cooperation and communication with the processor 235, the memory 237, and other components of the computing device 200 via the bus 220. In some implementations, the components of the query application 103 may send and receive data, via the communication unit 241, to and from one or more of the client devices 115, the visualization interface server 101, the analytics database server 120, and data sources 125.

The layout engine 201 may include software and/or logic to provide the functionality for facilitating a visualization and analysis of large datasets, such as big data. The layout engine 201 sends instructions to the user interface engine 207 to generate a user interface for an interactive exploration of data via data cubes 222 stored in the data storage 243. For example, an end user of the client device 115 may select a data cube from a list of data cubes in the user interface. The layout engine 201 generates a visualization of the data cube for the user to interact directly with the view by selecting corresponding graphical elements on the user interface. For example, the graphical elements may correspond to selecting and editing the visualization in terms of filtering and splitting the data to drill-down and analyze the data within defined dimensions and measures. Example data visualizations may include, but are not limited to, table, line chart, stacked area chart, spark line, vertical bars, horizontal bars, bar chart, treemap, spot matrix, sunburst, geo marks, geo shade, bubble chart, heat map, grid, sankey diagram, etc.

A data cube provides a granular form of data access and a framework for the user to explore the data freely in the visualization. A data cube may be defined on top of a datasource or SQL query via the data sources 125. In some implementations, the layout engine 201 enables a data manager to create data cubes at the time of data ingestion into the analytics database server 120. The layout engine 201 may analyze the underlying schema of a data source for a list of columns, types of columns, and aggregations (in case of rollup) to initialize a 'seed' data cube with suggested dimensions and measures. The data manager may then edit the suggested data cube or create a new data cube by creating well-named dimensions and measures to massage and transform the data to best represent the data. In one example, the data cube may be a "SQL data cube" if the dimensions and measures within it are defined using SQL. The data manager may also derive several key performance indicators (KPI) from the data in question. For example, the data manager may create one or more measures that reflect the KPI names by encoding the aggregate functions or expressions in query language by which to compute each KPI. Data cubes may be dynamic and backed by streaming data with high-frequency updates from the data sources 125. The data manager may set, for end users, access permissions to access a data cube. A data manager may be an entity who may have all the permissions of an end user as well as additional permissions. The layout engine 201 stores the data cubes 222 in the data storage 243.

As described above, a data cube may include a list of dimensions and measures. A dimension represents a quality that may distinguish one part of the data from another. A dimension may be used to filter and/or split the data for visualization and exploration. For example, dimensions may be used to split the data into segments and focus on a specific segment using filters. A custom dimension may be created to represent a transformation using an expression (e.g., dimension formula) in SQL or any other similar expression language. The dimension may have metadata, such as a human-readable title and formatting options. The dimension, together with its associated metadata, may be used to filter or split the data. Example dimensions may include, but are not limited to, time, string, numerical, geographical, Boolean, URL, query-time lookup, etc. Dimensions may be organized into groups. Groups are particularly useful for dimensions that come from the same basic attribute or are related in another way. For example, for a data cube created from a web traffic datasource, dimensions such as OS, browser name, browser version, etc. may be included in a group.

A measure may be a numeric value derived from the datasource. For example, a measure may be an aggregation or a function output. A measure may be a representation of an aggregate expression (e.g., SQL expression) applied to one or more segments of the data. A dimension may also be used in the aggregate expression of the measure. A measure may also have metadata, such as human-readable title and formatting options. For example, AVG ("session_length") expressed in SQL in the web traffic datasource is a measure. Measures may also be organized into groups based on a shared attribute. For example, for a data cube created from a sales dataset scenario, dimensions such as total revenue, minimum revenue, maximum revenue, average revenue, median revenue per user, etc. may be included in a group.

The layout engine 201 tracks user interactions with a view of the data that modify a view state of the data cube. For example, the view state of the data cube includes selected visualization, filters, splits, measures, comparisons, etc. The layout engine 201 receives user interactions in the visualization of the data cube and tracks the changes to the view of the data resulting from the user interactions. Example user interactions in the user interface of the client device 115 may include, but are not limited to, point-and-click, drag-and-drop, one-click, double-click, scroll, resize, expand, collapse, etc. The layout engine 201 in cooperation with the user interface engine 207 sets up the user interface for editing a selected visualization of the data cube. For example, the user may slice and dice the data in the visualization by selecting one or more dimensions, measures, and comparisons. The layout engine 201 may receive a user input of a filter in the user interface for data visualization. The user may filter the data by any dimension and/or measure of the data cube. A filter may be used to focus on a specific part of the data in the context of data querying. A filter may be defined as an action of applying a Boolean predicate to the data and selecting a portion of the data that matches that predicate. For example, the user may specify a filter to select only the values that match a certain text, match a regular expression, include a certain text, exclude a certain text, etc.

The layout engine 201 may receive a user input to split up the data by one or more dimensions in the visualization of the data cube. For example, consider a test datasource collecting user analytics on web traffic to a purpose-built website 'KttM'. In the KttM data cube, 'browser' may be one of the dimensions. The user may split up the data by 'browser' to visualize a breakdown of usage by browser. Splitting up data is useful in the context of data visualization compared to using SQL which groups data. In some implementations, the layout engine 201 uses a modal 'split combine' to represent the actual split of the data with specific bucketing (if needed) and the combine (sort and limit) in the visualization of data cubes in response to the user input to split up the data. For example, a logical breakdown of a split combine representing an example query, such as 'What are the top 10 browser(s) by number of events that have visited KttM?' to visualize the KttM data cube includes: a dimension ('browser'), no extra bucketing of the dimension, sorting with direction ('top'+'number of events'), and limit ('10') on the dimension. In another example, a logical breakdown of a split combine representing an example query, such as 'Show me the data broken up by time with hourly bucketing, in chronological order' includes: a dimension ('time'), bucketing ('hourly'), sorting with direction ('chronological order'), and no limit (common for time or other continuous dimensions). Bucketing, in the context of dimensions and splits, is a transformation applied to the dimension that changes its granularity in the visualization of the data cube. For example, for a 'time' dimension, bucketing may be rounding time to the hour or day. A day's worth of data split on time bucketed to the 'hour' may result in about 24 values. A day's worth of data split on time bucketed to the 'minute' may result in about 1440 values. In another example, for a numeric dimension, bucketing may be rounding to a range. For example, bucketing 'sessionLength' in the KttM data cube to buckets of size 1000 may result in buckets, such as [2000, 3000), [15000, 16000), etc. In the example buckets, '[' represents an inclusive bound and ')' represents an exclusive bound.

The layout engine 201 uses a data structure, such as an array 'splits' to hold zero or more split combines in the visualization of a data cube. The layout engine 201 dynamically builds the splits array based on the dimensions that are requested by the user to split up the data in the visualization. Unlike dimensions that require data cube editing permissions, the splits array may be modified by the user of the client device 115. If the splits array is empty, then it represents a 'Total', as it does not split up the data. If the splits array has a single split combine, then it represents the same question as that split combine (e.g., 'What are the top 10 browser(s) by number of events that have visited KttM?'). If the splits array has two or more split combines, then it represents a nested split. For example, a nested split represents a question, such as 'For the top five most popular operating systems, what are the top 10 browser(s) by number of events that have visited KttM?' In the context of data visualization, a representation of nested split is advantageous because there can be millions of values for operating systems and browsers in a large dataset. As opposed to grouping data together in SQL (GROUP BY), it is efficient to handle the visualization of such a large dataset by splitting it into pieces, and then splitting those pieces again.

The layout engine 201 determines a set of visibility constraints associated with rendering an on-demand visualization of a data cube in the user interface of the client device 115 based on receiving user interactions. The layout engine 201 facilitates with dynamic loading of data for on-demand visualization. For example, the layout engine 201 determines the cells of a visualization, such as a table visible on the display screen of the client device 115 that need to be rendered. The layout engine 201 ignores the rest of the cells of the visualization that are out of view on the display screen of the client device 115 and determines the set of visibility constraints corresponding to the visible cells. Each visibility constraint in the set of visibility constraints may be a pair of numbers representing a minimum number and a maximum number of the values that need to be displayed in the visualization.

An advantage of such dynamic loading in visualization is that the resource utilization in a cluster is bound by the display screen size of the client device 115. The complexity of the visualization is the order of the resolution of the display screen of the client device 115. The data may be queried dynamically and completely on demand for the visualization. This reduces the load on the cluster, enables more multi-tenant users to use the service provided by the visualization interface server 101, and makes possible complex data investigation and exploration while preserving the comforts of the defined dimensions and measures.

The layout engine 201 identifies a change in query parameters resulting from the user interaction for visualizing data on the user interface. Examples of change include, but are not limited to, the user bringing cells of a table into view on the display of the client device 115 via scrolling the user interface, expanding the data, collapsing the data, filtering the data, splitting the data, selecting types of visualizations, dimensions, measures, and comparison, etc. The layout engine 201 determines a height, a width, and an area visible in the user interface depicting the visualization of the data cube. The layout engine 201 determines the set of visibility constraints based on the height, the width, and the area of the data visualization visible in the user interface. For example, the layout engine 201 detects 10 fields (cells) in plain view from the top in the visualization of the data cube as a table. The 10 fields are bound by the height, the width, and the area visible in the display screen. The layout engine 201 computes [0, 10] as a set of visibility constraints. The layout engine 201 sends the set of visibility constraints to the data container engine 203 and the data fetch engine 205.

The data container engine 203 may include software and/or logic to provide the functionality for data management in the visualization of a data cube. The data container engine 203 in cooperation with the data fetch engine 205 manages the loading states of data values needed for a given visualization. In some implementations, the data container engine 203 uses a data structure, such as a 'split axis' array to represent the values and loading states of splits (which may be nested) in the visualization of a data cube. The split axis may not have to correspond to an 'axis' for the purposes of rendering.

Consider Table I as shown below:

TABLE I

| Browser | Count | Session Length |
|---|---|---|
| Total | 225 | 1.3 |
| Chrome | 123 | 1.2 |
| Firefox | 90 | 0.9 |
| Safari | 12 | 2.0 |

In the example Table I above, there is a split axis on 'Browser' with four values. For example, the value at index 2 is 'Firefox' that represents a filter of 'Browser'='Firefox.' The values of the split axis may not all be loaded. In some implementations, the data container engine 203 receives the set of visibility constraints from the layout engine 201 and determines which of the values in the split axis need to be further loaded for the on-demand visualization based on the set of visibility constraints. The data container engine 203 manages the loading state of one or more splits in the split axis. For example, the data container engine 203 indicates a loading state for the values to be loaded next as 'pending' in the split axis. The data container engine 203 instructs the data fetch engine 205 to fetch the corresponding values from the database. The data fetch engine 205 detects which of the values are to be loaded based on their associated states in the split axis and issues queries to fetch them accordingly.

The data container engine 203 uses a data container, such as a 'facet frame' to manage the loading of 'facets' needed for a given visualization of the data cube. A facet may refer to one segment of data, usually a single number, or a smallest unit of data that is made available. For example, a facet may be the value of a cell in a table defined by the filter and measure that it represents. In other words, a facet is both the value and the measure of the work needed to calculate the value of a cell in the table. The data container provides the data values to the layout engine 201 for rendering in one or more visualizations on-demand. The data container engine 203 identifies every facet (number) of the data in the data container to be an individual entity that can be queried individually and in tandem with other facets. In Table I above, there are eight facets. If 'y' is the split axis on browser in the vertical direction, then the facet in coordinate {y: 2, measure: 1} has the value of 0.9. This facet-based approach breaks down a visualization of data to the smallest possible unit. The data container engine 203 stores the data container 224 in the data storage 243.

The data fetch engine 205 may include software and/or logic to provide the functionality for managing one or more worker functions that periodically check in with the one or more data structures maintained by the data container engine 203 to determine whether there are values to be loaded for the visualization. The worker function may operate as a data loader to fetch the needed data for on-demand visualization from the database in the analytics database server 120 accordingly. In some implementations, the data fetch engine 205 receives the set of visibility constraints from the layout engine 201 and invokes a worker function to periodically check in with the data structures, such as the split axes and the data containers using the set of visibility constraints.

Consider Table II as shown below:

TABLE II

| Browser > OS | Count |
|---|---|
| Total | 225 |
| Chrome | 123 |
| ↳ Windows | 100 |
| ↳ OS X | 20 |
| ↳ Linux | 3 |
| Firefox | 90 |
| ↳ Linux | 40 |
| ↳ Windows | 30 |
| ↳ OS X | 20 |
| Safari | 12 |
| ↳ OS X | 12 |

In Table II above, the data is split on two dimensions: 'Browser' and 'OS'. There is a nested split axis 'Browser>OS' in Table II. The values of 'OS' are nested within the values of 'Browser'. Assume that the limit on the dimension 'Browser' is 1000 and the limit on the dimension 'OS' is three for readability of the example. The split axis 'Browser>OS' in Table II represents a query: "For each of the top 1000 browsers, what are the top 3 operating systems?" The split axis 'Browser>OS' includes the following values: 'Total' (level 0), 'Chrome' (level 1), 'Windows' (level 2), 'OS X' (level 2), 'Linux' (level 2), 'Firefox' (level 1), etc. The 'level' refers to the nesting level in the split axis. For example, in the split axis 'Browser>OS', 'Chrome'>'OS X' has level 2 as it is nested twice but it is at index 3 because it is fourth in the list.

The lifecycle of a split axis is now described with an example of how the split axis 'Browser>OS' in Table II above is loaded by the data container engine 203 and the data fetch engine 205. In the context of loading the example split axis 'Browser>OS', it should be understood that the values under column 'Count' have no significance and are just added to make Table II above look complete.

The data container engine 203 determines an initial state of the split axis 'Browser>OS' and identifies a loading state of the splits in the split axis. For example, the initial state of the split axis 'Browser>OS' in Table II contains just the 'Total' value. The data container engine 203 automatically marks this value as 'pending' (indicated by '~') in the split axis 'Browser>OS'. It should be understood that the values in the column 'Count' may be loaded separately but are not loaded in this example lifecycle of the split axis 'Browser>OS'.

TABLE IIa

| Browser > OS | Count |
| --- | --- |
| ~Total | — |

The data fetch engine 205 receives the set of visibility constraints from the layout engine 201 and invokes a worker function to periodically check in with the split axis 'Browser>OS' using the set of visibility constraints. In some implementations, the layout engine 201 may call the worker function directly with the set of visibility constraints to periodically check in with the split axis 'Browser>OS'. For example, the worker function, when it is not already performing the work of loading, periodically checks in with the data structures maintained by the data container engine 203 every 100 milliseconds. At every check in, the worker function performs the loading work if there has been new data requested for visualization following a user interaction (e.g., expanding a nested data value in the visualization, etc.). The period between check-ins is small enough that it effectively acts as a 'debounce'. The user may experience that the visualization is updated with data immediately following their interactions in the user interface but their interactions get grouped into 100 milliseconds chunks. This addresses noisy interactions, such as scrolling, window resizing, etc. in the user interface that may otherwise generate a lot of check-ins.

Continuing with loading the example split axis 'Browser>OS', assume for example that the layout engine 201 determines that 10 values from the top of the table can be shown in the display screen of the client device 115 in response to a user interaction. The layout engine 201 sends [0, 10] as the visibility constraints to a worker function managed by the data fetch engine 205. The worker function checks in with the split axis 'Browser>OS' and determines that the value at index 0 (Total) is pending and is need of loading. The worker function generates a query based on the nesting level (level 0) of the value 'Total' and issues the query to the database in the analytics database server 120. For example, the split combine at index 0 in the split axis 'Browser>OS' is a split on 'Browser' and the worker function issues a query that is logically equivalent to "SELECT browser FROM kttm GROUP BY 1 ORDER BY count(*) DESC LIMIT 1000." As a result of executing this query, the worker function loads the children of 'Total' according to the split combine. The limit of the split combine is 1000 by default. The "count(*)" is the measure on which the split combine is sorted to define an ordering for the browser results. The worker function returns or fetches the following results for the query in order:
Chrome
Firefox
Safari
Brave
Opera The data fetch engine 205 or the worker function inserts the above results into the split axis 'Browser>OS' in a collapsed state as shown below.

TABLE IIb

| Browser > OS | Count |
| --- | --- |
| Total | — |
| Chrome | — |
| Firefox | — |

TABLE IIb-continued

| Browser > OS | Count |
| --- | --- |
| Safari | — |
| Brave | — |
| Opera | — |

The children of 'Total' are set to be expanded. The data fetch engine 205 configures the worker function to run again on schedule to check in with the split axis 'Browser>OS' using the same visibility constraints [0, 10] and finds nothing to do because everything that needs to be expanded has been. The worker function does not, by default, automatically expand values other than the root 'Total'. The worker function may not perform any further work until there is a user interaction in association with the visualization.

Suppose there is another user interaction in association with the visualization. The layout engine 201 informs the data container engine 203 about the user interaction. For example, assume the user triggers an expansion on 'Chrome' in the visualization on the user interface. The data container engine 203 marks the expansion on 'Chrome' in the split axis 'Browser>OS' as 'pending'.

TABLE IIc

| Browser > OS | Count |
| --- | --- |
| Total | — |
| ~Chrome | — |
| Firefox | — |
| Safari | — |
| Brave | — |
| Opera | — |

The layout engine 201 again calls the worker function managed by the data fetch engine 205 with the visibility constraints [0, 10] to check in with the split axis 'Browser>OS'. The worker function determines that "Chrome" at nesting level 1 is to be loaded next. The split combine at index 1 is a split on "OS". The worker function generates a query that is logically equivalent to "SELECT OS FROM kttm WHERE browser='Chrome' GROUP BY 1 ORDER BY count(*) DESC LIMIT 3" and issues the query to the database in the analytics database server 120. The worker function returns or fetches the following results for the query in order:
Windows
OS X
Linux The data fetch engine 205 or the worker function inserts the above results into the split axis 'Browser>OS' in a collapsed state as shown below.

TABLE IId

| Browser > OS | Count |
| --- | --- |
| Total | — |
| Chrome | — |
| ↳ Windows | — |
| ↳ OS X | — |
| ↳ Linux | — |
| Firefox | — |
| Safari | — |
| Brave | — |
| Opera | — |

There is nothing for the data container engine 203 to mark as pending in the split axis 'Browser>OS' until another user interaction occurs. Assume, for example, the user triggers an expansion on "Safari" in the visualization. The worker function runs on schedule with the visibility constraints [0, 10] again. The worker function issues a query that is logically equivalent to "SELECT OS FROM kttm WHERE browser='Safari' GROUP BY 1 ORDER BY count(*) DESC LIMIT 3" to the analytics database server 120. The result fetched is 'OS X' and the data fetch engine 205 inserts the above value into the split axis 'Browser>OS' in a collapsed state as shown below.

TABLE IIe

| Browser > OS | Count |
|---|---|
| Total | — |
| Chrome | — |
| ↳ Windows | — |
| ↳ OS X | — |
| ↳ Linux | — |
| Firefox | — |
| Safari | — |
| ↳ OS X | — |
| Brave | — |
| Opera | — |

The layout engine 201 retrieves the values of the splits from the split axis (which can be nested) as loaded by the worker function and renders them in the visualization of the data cube on the user interface. The layout engine 201 may return to the worker function with another set of visibility constraints to further dynamically load the values of the splits in the split axis.

The data container managed by the data container engine 203 may be defined by the following aspects:
(a) An arbitrary number of named split axes potentially representing arbitrary nested splits,
(b) An array of selected measures for the visualization, and
(c) An optional comparison.

The data container, as a data structure in and of itself, may represent a multi-dimensional array of facets. The number of dimensions in the multi-dimensional array is number of split axes+measure axis index+comparison axis index (optional). An entry in the multi-dimensional array is a facet defined as a filter-measure pair. The filter in the filter-measure pair is derived from combining the respective filters of all the axes values. The measure in the filter-measure pair is derived from the measure coordinate. The filter-measure pair may be arbitrarily transformed by comparison transformation if the compare axis index is one. For example, each facet in the data container represents a single data value, such as "Revenue from country=USA, for 2022 Apr. 15." If the data container has a comparison 'axis' optionally defined, then the data container may associate each facet with its comparison value. For example, if a comparison is defined "versus a day ago" in the data container, then the facet "Revenue from country=USA, for 2022 Apr. 15" may be associated with a comparison facet of "Revenue from country=USA, for 2022 Apr. 14".

Existing visualization interfaces support the following configurations, such as one nested split axis with dynamic loading (for table visualization), one nested split axis with maximum of one level of nesting without dynamic loading (for line chart, bar chart, treemap, sunburst, geo, and bubble chart visualizations), and two non-nested split axes without dynamic loading (for heatmap, grid, and sankey visualizations). The above configurations are limiting. Firstly, it is not possible to implement a two nested split axes with dynamic loading in any of them. Dynamic loading is critical in such a use case as the number of values in the intersection of two nested split axes can be huge. With dynamic loading absent, the above configurations need all of the data to be loaded upfront which is not ideal when dealing with a large dataset. Second, the implementation of the above three configurations needs three different data-fetching code paths to maintain. In contrast, a key feature of the visualization interface implementing dynamic loading with data container is that it allows for defining any number of split axes and each one may be arbitrarily nested. The dynamic loading of the data container allows for different visualizations of the data to share the same query system, thereby reducing maintenance overhead.

In some implementations, the data container engine 203 cooperates with one or more worker functions of the data fetch engine 205 to manage and dynamically load facets in the data container needed for a given visualization. The data fetch engine 205 receives the set of visibility constraints from the layout engine 201. The set of visibility constraints may correspond to visible cell indices across one or more axes of the data container including a multidimensional array of facets. The data fetch engine 205 invokes a worker function to periodically check in with the data container using the set of visibility constraints to identify the facets that need to be loaded and to issue corresponding queries for fetching them. When the queries fetch a response from the analytics database server 120, the worker function loads the facets into the data container. In some implementations, the data container engine 203 marks a facet in the data container as 'pending' when a worker function is called for it and the worker function identifies the corresponding facet in the data container needs to be loaded. The data fetch engine 205 evaluates a set of possible query plans for loading the pending facet using one or more strategies and finds the least expensive one. The data container engine 203 marks the facet as 'loading' in the data container after the worker function identifies that the facet needs to be loaded. The worker then issues a query to load the facet based on the query plan. The worker function decodes the result once the query returns a response and loads the facet into the data container. The data container engine 203 updates the facet by setting a 'loaded' state for the facet in the data container. The layout engine 201 retrieves the values of the loaded facets from the data container as loaded by the worker function and renders them in the visualization of the data cube on the user interface.

The loading of facets in a data container is now described with the following example. The loading mechanism described above for split axis is also applicable to the data container. The following example describes loading of facets by the data container engine 203 and the data fetch engine 205. Consider the following data:
Split Axes:
  HasAdblock (name: x, 3 values)
  Browser>OS (name: y, 11 values)
Measures: Number of events, Avg Session Length (shown within the cells)

TABLE III

|  | Total | False | True |
|---|---|---|---|
| Total | 225; 1.2 | 125; 1.3 | 100; 1.1 |
| Chrome | 123; 3.4 | 100; 3.5 | 23; 3.3 |
| ↳ Windows | 100; 2.3 | 90; 2.4 | 10; 2.2 |

TABLE III-continued

|  | Total | False | True |
|---|---|---|---|
| ↳ OS X | 20; 1.0 | 20; 1.1 | 20; 0.9 |
| ↳ Linux | 3; 2.0 | 3; 2.1 | 0; 0.0 |
| Firefox | 90; 0.9 | 40; 0.8 | 50; 1.1 |
| ↳ Linux | 40; 2.3 | 20; 2.4 | 20; 2.2 |
| ↳ Windows | 30; 0.8 | 10; 0.7 | 20; 0.9 |
| ↳ OS X | 20; 0.6 | 15; 0.5 | 5; 1.0 |
| Safari | 12; 1.0 | 12; 1.0 | 0; 0.0 |
| ↳ OS X | 12; 1.0 | 12; 1.0 | 0; 0.0 |

In the above Table III, there are 11 values in the 'Browser>OS' nested split axis (vertical direction 'y'), and three values in the 'HasAdblock' split axis (horizontal direction 'x'). Also, there are two measures: 'Count' and 'Avg Session Length'. The data container representation in Table II contains 11*3*22=66 facets. The facets in the data container are indexed using a named coordinate. The named coordinate may be an object keyed on (a) axes names for the split axis, (b) compare names for the compare axis index, and (c) measure names for the measure axis index. The values of all these names are indices into the multi-dimensional map corresponding to the data container.

In the Table III above, the split axis (x) represents the columns 'Total', 'False', and 'True'. The nested split axis (y) represents the rows with browser and operating system names. Since indexes start counting from zero, the facet at example coordinate {x: 1, y: 5, measure: 0}, for example, has a value '40' in the Table III. In the example coordinate, x: 1 maps to the column labeled 'False', y: 5 maps to the row in that column labeled with 'Firefox', and measure: 0 maps to the facet with the value 40. Similarly, the facet at another example coordinate {x: 0, y: 2, measure: 1} has a value '2.3'.

The following Table III(a) shows the state where no facets are loaded but the split axes have been loaded in the data container by the data fetch engine 205. This occurs when, for example, changing query parameters in the visualization interface on the client device 115 causes some or all of the facets in the data container to be invalidated. The following example describes the loading of facets.

TABLE IIIa

|  | Total | False | True |
|---|---|---|---|
| Total | —; — | —; — | —; — |
| Chrome | —; — | —; — | —; — |
| ↳ Windows | —; — | —; — | —; — |
| ↳ OS X | —; — | —; — | —; — |
| ↳ Linux | —; — | —; — | —; — |
| Firefox | —; — | —; — | —; — |
| ↳ Linux | —; — | —; — | —; — |
| ↳ Windows | —; — | —; — | —; — |
| ↳ OS X | —; — | —; — | —; — |
| Safari | —; — | —; — | —; — |
| ↳ OS X | —; — | —; — | —; — |

In some implementations, the data fetch engine 205 receives a set of visibility constraints from the layout engine 201. For example, the data fetch engine 205 receives an initial set of visibility constraints provided as {x: [0, 2], y: [0, 3], measure: [0, 1]}. The data fetch engine 205 determines that first two values on the split axis named 'x', first three values on the split axis named 'y', and only the first measure need to be loaded based on the set of visibility constraints. The data fetch engine 205 invokes a worker function to periodically check in with the data container using the set of visibility constraints to determine whether there are any facets to be loaded. The data container engine 203 identifies the following 6 facets, expressed as filter-measure pairs, need to be loaded to the worker function inquiring the data container.

Total, Count (the value is 225)
hasAdblock=false, Count (the value is 125)
browser='Chrome', Count (the value is 123)
browser='Chrome' AND hasAdblock=false, Count (the value is 100)
browser='Chrome' AND OS='Windows', Count (the value is 100)
browser='Chrome' AND OS='Windows' AND hasAdblock=false, Count (the value is 90)

In some implementations, the worker function generates a query for the above facets defined by the filter-measure pair. The worker function issues the query to the database in the analytics database server 120. After the query returns results, the worker function loads the facets into the data container. The state of facet loading in the data container is shown as below.

TABLE IIIb

|  | Total | False | True |
|---|---|---|---|
| Total | 225; — | 125; — | —; — |
| Chrome | 123; — | 100; — | —; — |
| ↳ Windows | 100; — | 90; — | —; — |
| ↳ OS X | —; — | —; — | —; — |
| ↳ Linux | —; — | —; — | —; — |
| Firefox | —; — | —; — | —; — |
| ↳ Linux | —; — | —; — | —; — |
| ↳ Windows | —; — | —; — | —; — |
| ↳ OS X | —; — | —; — | —; — |
| Safari | —; — | —; — | —; — |
| ↳ OS X | —; — | —; — | —; — |

If the layout engine 201 determines that the user scrolled the user interface layout such that the user interaction caused a shift in the visibility on the 'y' axis by 2 and also caused all the measures to come into view on the display of the client device 115, a next set of visibility constraints is identified as {x: [0, 2], y: [2, 3], measure: [0, infinity]}. The data container engine 203 identifies the following 10 facets need to be loaded to the worker function inquiring the data container on schedule using the next set of visibility constraints. The facets are expressed as filter-measure pairs:

browser='Chrome' AND OS='Windows', Avg Session Length
browser='Chrome' AND OS='Windows' AND hasAdblock=false, Avg Session Length
browser='Chrome' AND OS='OS X', Count
browser='Chrome' AND OS='OS X', Avg Session Length
browser='Chrome' AND OS='OS X' AND hasAdblock=false, Count
browser='Chrome' AND OS='OS X' AND hasAdblock=false, Avg Session Length
browser='Chrome' AND OS='Linux', Count
browser='Chrome' AND OS='Linux', Avg Session Length
browser='Chrome' AND OS='Linux' AND hasAdblock=false, Count
browser='Chrome' AND OS='Linux' AND hasAdblock=false, Avg Session Length The worker function issues a query to the database in the analytics database server 120. After the query returns results, the worker function loads these facets into the data container. The state of facet loading is shown as below.

TABLE IIIc

|  | Total | False | True |
|---|---|---|---|
| Total | 225; — | 125; — | —; — |
| Chrome | 123; — | 100; — | —; — |
| ↳ Windows | 100; 2.3 | 90; 2.4 | —; — |
| ↳ OS X | 20; 1.0 | 20; 1.1 | —; — |
| ↳ Linux | 3; 2.0 | 3; 2.1 | —; — |
| Firefox | —; — | —; — | —; — |
| ↳ Linux | —; — | —; — | —; — |
| ↳ Windows | —; — | —; — | —; — |
| ↳ OS X | —; — | —; — | —; — |
| Safari | —; — | —; — | —; — |
| ↳ OS X | —; — | —; — | —; — |

With the above-described dynamic loading of the data container, huge datasets can be represented and visualized with ease. For example, consider a visualization having 4 split axes with 10000 values each, 10 measures, and a compare that is $10000^4 \times 4 \times 10 \times 2$ which equates to two hundred thousand trillion facets. With a considerable layout, there would never be a need to load all those values upfront with the dynamic loading of the data container.

The user interface engine 207 may include software and/or logic for providing user interfaces to a user. In some implementations, the user interface engine 207 receives instructions from one or more of the components 201, 203, and 205, generates a user interface according to the instructions, and transmits the user interface for display on the client device 115 as described with reference to FIGS. 4-5. In some implementations, the user interface engine 207 sends graphical user interface data to an application (e.g., a browser) in the client device 115 via the communication unit 241 causing the application to display the data as a graphical user interface.

FIG. 3 shows one implementation of a general data flow 300 through the components of the query application 103 to facilitate on-demand visualization of data. The layout engine 201 tracks user interactions in the visualization of the data cube on the user interface of the display screen 301 and tracks the changes to the view of the data resulting from the user interactions. For example, the user may change query parameters in the visualization and this causes some or all of the data in the data container associated with that visualization to be invalidated. The layout engine 201 determines a height, a width, and an area visible in the user interface depicting the visualization of the data cube via the signal line 303. In some implementations, the layout engine 201 determines the visibility constraints in terms of visible cell indices across one or more axes of the data container based on the height, the width, and the area visible in the user interface. The layout engine 201 passes the visibility constraints to the data fetch engine 205 via signal line 305. The data fetch engine 205 invokes one or more worker functions using the visibility constraints. The worker function runs on a schedule to periodically check in with the data structures, such as the data container maintained by the data container engine 203 to determine whether there are missing split axis and cell data that need to be loaded in the data container via the signal line 307. In some implementations, the data fetch engine 205 issues a query for the missing data that need to be loaded to the database in the analytics database server 120 over the network 105 via signal lines 309 and 311. The worker function in the data fetch engine 205 receives a response to the data request from the analytics database server 120 and loads the data into the data structures, such as the data container managed by the data container engine 203 via the signal line 313. The layout engine 201 queries the data container engine 203 to retrieve data in view of the display screen from the associated data container via the signal line 315 and receives the needed data from the data container engine 203 via the signal line 317. The layout engine 201 then renders the needed data in the visualization on the display screen 301 via signal line 319.

FIG. 4 shows a graphical representation of an example user interface 400 depicting a table visualization for data exploration and analysis. In FIG. 4, the user interface 400 may be a visualization interface that allows performing arbitrary drill-downs of a dataset through user interactions, such as drag-and-drop, point-and-click, one-click, double-click, scroll, resize, expand, collapse, etc. in the visualization. The user interface 400 displays the name 401 of the dataset or data cube explored in the table visualization. The dimension panel 403 on the left displays a list of dimensions for the data cube that can be added to the split axis control panel 413. The measures panel 419 on the left displays a list of measures for the data cube that can be added to the split axis control panel 413. A filter bar 407 is provided at the top to filter the data by any dimension or measure selected from the dimension panel 403 and the measures panel 419. The user interface 400 further includes a visualization selector 411 on the right which is a drop down menu to select different types of visualization. The split axis control panel 413 on the right provides controls for adding or removing dimensions, measures, and comparisons to explore the data in the visualization. The user interface 400 includes a layout 405 for displaying the table visualization that may be scrolled, zoomed in or out, and/or resized by the user as needed to explore. The table visualization includes the rows 417 representing the split axis (y) and the columns 409 representing the split axis (x). The table visualization shows a view of data with shading in cells 415 that aids visualization of measure magnitude. The cells outside the visible area in the layout 405 are not loaded until the user interaction brings them into view.

Figure 5:
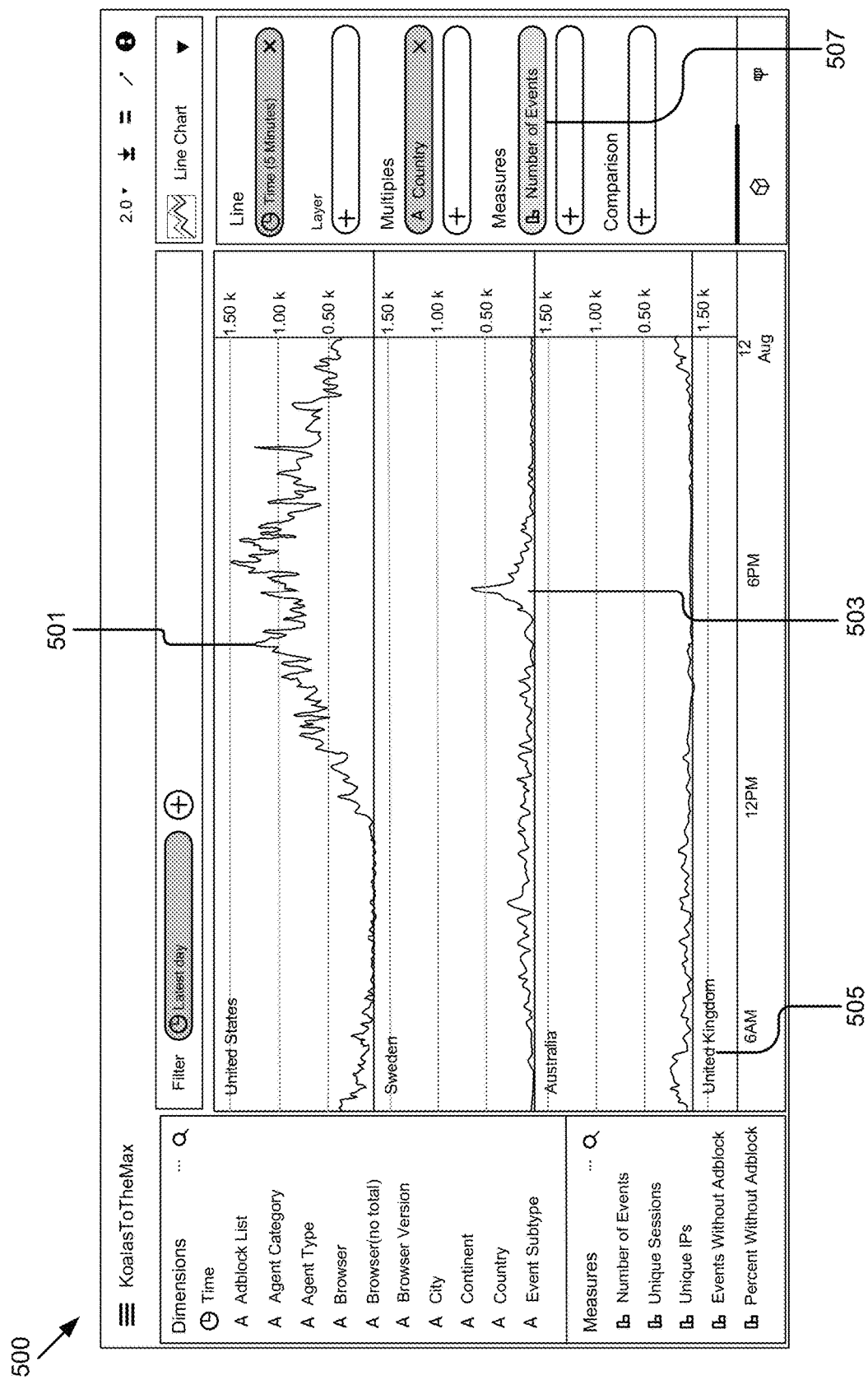
FIG. 5 shows a graphical representation of an example user interface depicting a line chart visualization for data exploration and analysis.

FIG. 5 shows a graphical representation of an example user interface 500 depicting a line chart visualization for data exploration and analysis. In FIG. 5, the user interface 500 depicts the line chart visualization to show temporal dimension. The line chart demonstrates a trend over time (line 501), such as a day, for each country (row 505). The line 501 represents the split axis (x) and the row 505 represents the split axis (y). The area under the line 501 are the data cells 503 showing the aggregation "Number of Events" 507. The line chart also has the ability to compare the segments of the first shown dimension to each other over time.

Figure 6:
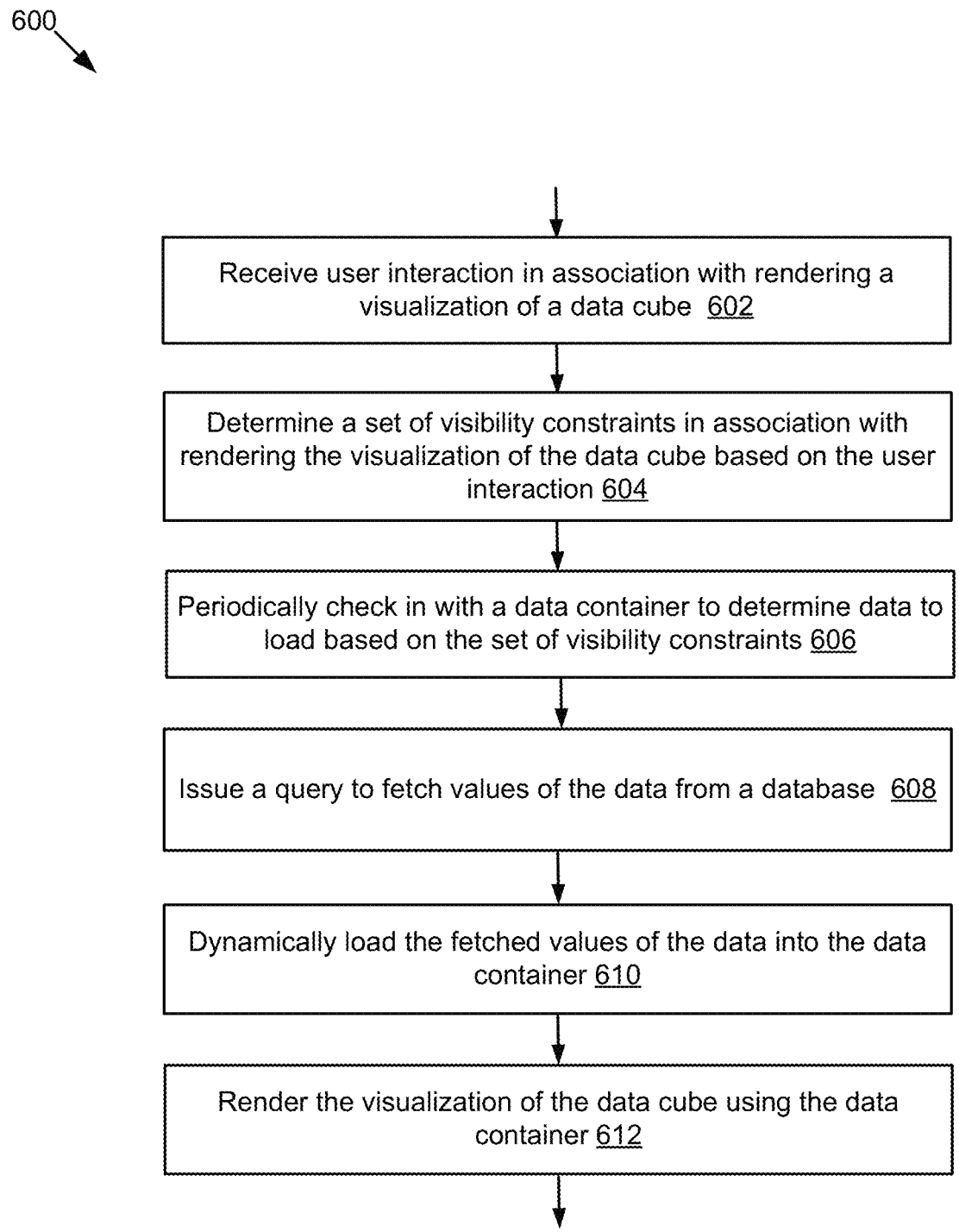
FIG. 6 is a flow diagram illustrating one implementation of an example method for dynamically loading of data in association with rendering a visualization of a data cube.

FIG. 6 is a flow diagram illustrating one implementation of an example method 600 for dynamically loading of data in association with rendering a visualization of a data cube. The method 600 may be performed by a system of one or more computing devices in one or more locations, including, for example, the visualization interface server 101 and the client device 115 of FIG. 1.

At 602, the layout engine 201 receives user interaction in association with rendering a visualization of a data cube. At 604, the layout engine 201 determines a set of visibility constraints in association with rendering the visualization of the data cube based on the user interaction. At 606, the data fetch engine 205 periodically checks in with a data container to determine data to load based on the set of visibility constraints. At 608, the data fetch engine 205 issues a query to fetch values of the data from a database. At 610, the data fetch engine 205 dynamically loads the fetched values of the data into the data container. At 612, the layout engine 201 renders the visualization of the data cube using the data container.

Figure 7:
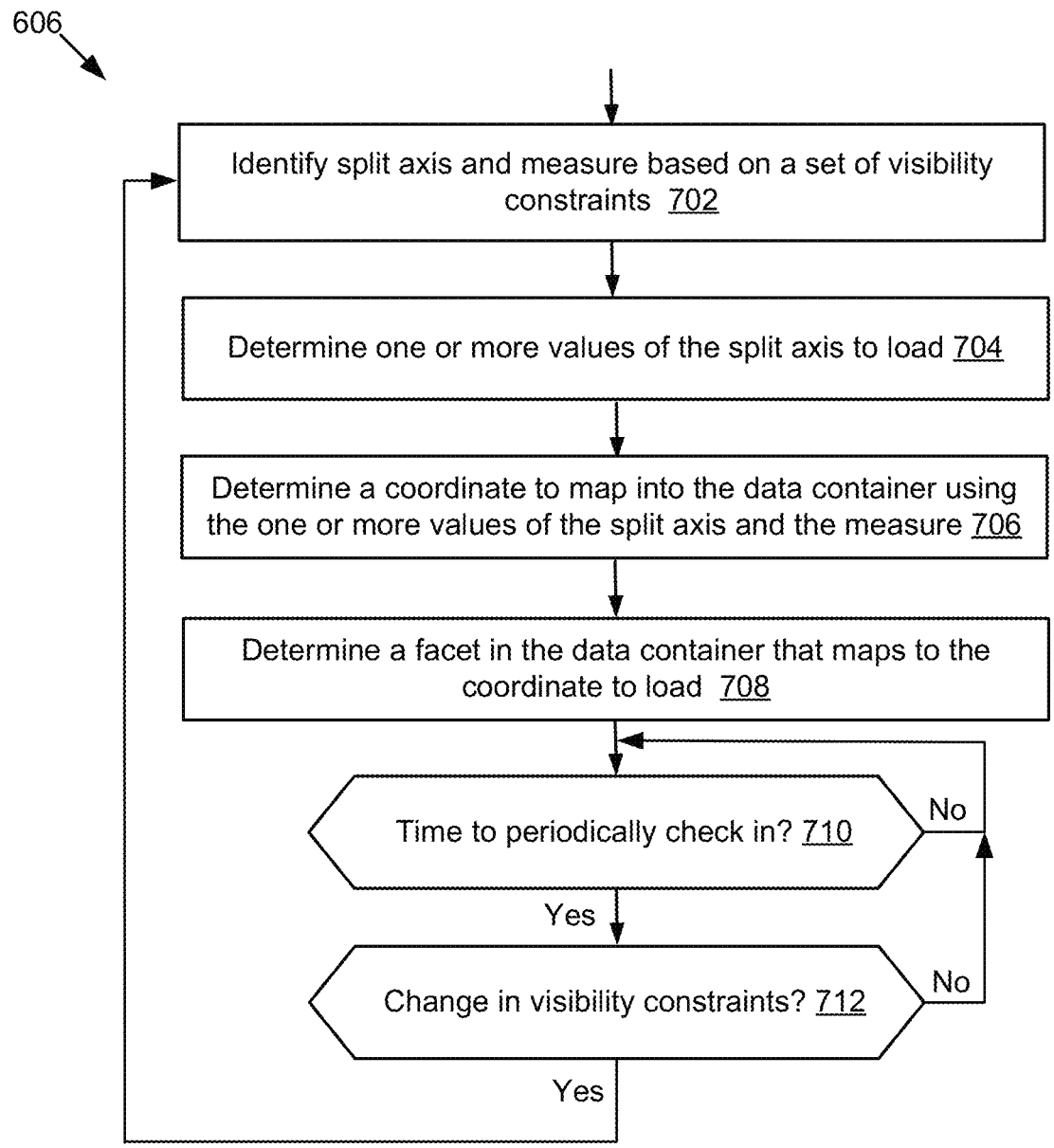
FIG. 7 is a flow diagram illustrating one implementation of an example method for periodically checking in with a data container.

FIG. 7 is a flow diagram illustrating one implementation of an example method 606 for periodically checking in with a data container. At 702, the data fetch engine 205 identifies a split axis and measure in the data container based on the set of visibility constraints. At 704, the data fetch engine 205 determines one or more values of the split axis in the data container to load. At 706, the data container engine 203 determines a coordinate to map into the data container using one or more values of the split axis and the measure. At 708, the data container engine 203 determines a facet in the data container that maps to the coordinate to load. At 710, the data fetch engine 205 checks whether it is time to periodically check in with the data container. If yes, at 712, the data fetch engine 205 checks whether there is a change in the visibility constraints. If yes, the method 606 proceeds to step 702 again. If there is no change in the visibility constraints, the method 606 loops back to step 710. If it is not time yet to periodically check in with the data container, the method 606 loops back to step 710.

A system and method for implementing a dynamic query mechanism has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one implementation above primarily with reference to software and particular hardware. However, the present invention applies to any type of computing system that can receive data and commands, and present information as part of any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
    receiving user interaction in association with rendering a visualization of a data cube in a user interface of a client device, the user interaction being one of a group of user interactions received in a predetermined interval of time;
    responsive to receiving the user interaction, determining a data container including a multi-dimensional array of data associated with the visualization of the data cube and a set of visibility constraints corresponding to one or more indices of the multi-dimensional array of data in the data container brought into view in the user interface of the client device by the user interaction, wherein bounds in the set of visibility constraints is defined by a display size of the user interface of the client device and a number of dimensions in the data container is defined by a number of split axes, a measure axis, and a comparison axis in the multi-dimensional array of data;
    periodically checking in with the data container using the set of visibility constraints every predetermined interval of time to determine that there is data to be loaded;
    responsive to determining that there is data to be loaded, issuing a query to fetch values of the data from a database;
    dynamically loading the fetched values of the data into the data container; and
    rendering the visualization of the data cube in the user interface of the client device using the dynamically loaded data container.

2. The computer-implemented method of claim 1, wherein determining the set of visibility constraints comprises:
    determining a height, a width, and an area visible in the user interface depicting the visualization of the data cube on a display screen of the client device responsive to receiving the user interaction; and
    determining the set of visibility constraints based on the height, the width, and the area visible in the user interface depicting the visualization of the data cube on the display screen of the client device.

3. The computer-implemented method of claim 1, wherein periodically checking in with the data container using the set of visibility constraints every predetermined interval of time to determine that there is data to be loaded further comprises:
    identifying a split axis and a measure that needs loading in association with the visualization of the data cube based on the set of visibility constraints;
    determining the data including one or more values of the split axis in the data container to load;
    determining a coordinate to map into the data container using the values of the split axis and the measure; and
    determining the data including a facet in the data container that maps to the coordinate to load.

4. The computer-implemented method of claim 3, wherein periodically checking in with the data container using the set of visibility constraints every predetermined interval of time to determine that there is data to be loaded further comprises determining that there is a change in the set of visibility constraints.

5. The computer-implemented method of claim 3, wherein the split axis is nested.

6. The computer-implemented method of claim 1, wherein the user interaction includes one from a group of:
    filtering data in the visualization of the data cube,
    splitting the data in the visualization of the data cube,
    selecting a type of visualization, a measure, and a comparison of measure in the visualization of the data cube, and
    scrolling the user interface depicting the visualization of the data cube.

7. The computer-implemented method of claim 1, wherein the data container comprises the number of split axes and an array of selected measures in association with rendering the visualization of the data cube.

8. The computer-implemented method of claim 1, wherein the data container is a data structure comprising a multi-dimensional array of facets, each facet indexed by a coordinate including filter and measure.

9. The computer-implemented method of claim 1, wherein each one in the set of visibility constraints is a pair of numbers representing a minimum and maximum number of values to load in the visualization of the data cube.

10. The computer-implemented method of claim 1, wherein the database is a table.

11. A system comprising:
one or more processors; and
a memory, the memory storing instructions, which when executed cause the one or more processors to:
receive user interaction in association with rendering a visualization of a data cube in a user interface of a client device, the user interaction being one of a group of user interactions received in a predetermined interval of time;
responsive to the user interaction received, determine a data container including a multi-dimensional array of data associated with the visualization of the data cube and a set of visibility constraints corresponding to one or more indices of the multi-dimensional array of data in the data container brought into view in the user interface of the client device by the user interaction, wherein bounds in the set of visibility constraints is defined by a display size of the user interface of the client device and a number of dimensions in the data container is defined by a number of split axes, a measure axis, and a comparison axis in the multi-dimensional array of data;
periodically check in with the data container using the set of visibility constraints every predetermined interval of time to determine that there is data to be loaded;
issue a query to fetch values of the data from a database responsive to determining that there is data to be loaded;
dynamically loading the fetched values of the data into the data container; and
render the visualization of the data cube in the user interface of the client device using the dynamically loaded data container.

12. The system of claim 11, wherein to determine the set of visibility constraints, the instructions further cause the one or more processors to:
determine a height, a width, and an area visible in the user interface depicting the visualization of the data cube on a display screen of the client device responsive to receiving the user interaction; and
determine the set of visibility constraints based on the height, the width, and the area visible in the user interface depicting the visualization of the data cube on the display screen of the client device.

13. The system of claim 11, wherein to periodically check in with the data container using the set of visibility constraints every predetermined interval of time to determine that there is data to be loaded, the instructions further cause the one or more processors to:
identify a split axis and a measure that needs loading in association with the visualization of the data cube based on the set of visibility constraints;
determine the data including one or more values of the split axis in the data container to load;
determine a coordinate to map into the data container using the values of the split axis and the measure; and
determine the data including a facet in the data container that maps to the coordinate to load.

14. The system of claim 13, wherein to periodically check in with the data container using the set of visibility constraints every predetermined interval of time to determine that there is data to be loaded, the instructions further cause the one or more processors to determine that there is a change in the set of visibility constraints.

15. The system of claim 13, wherein the split axis is nested.

16. The system of claim 11, wherein the user interaction includes one from a group of:
filtering data in the visualization of the data cube,
splitting the data in the visualization of the data cube,
selecting a type of visualization, a measure, and a comparison of measure in the visualization of the data cube, and
scrolling the user interface depicting the visualization of the data cube.

17. The system of claim 11, wherein the data container comprises the number of split axes and an array of selected measures in association with rendering the visualization of the data cube.

18. The system of claim 11, wherein the data container is a data structure comprising a multi-dimensional array of facets, each facet indexed by a coordinate including filter and measure.

19. The system of claim 11, wherein each one in the set of visibility constraints is a pair of numbers representing a minimum and maximum number of values to load in the visualization of the data cube.

20. The system of claim 11, wherein the database is a table.

* * * * *